Jan. 25, 1966      L. J. WOLF      3,231,057

SHAFT COUPLING

Filed July 13, 1962      2 Sheets-Sheet 1

INVENTOR,
LLOYD J. WOLF.
BY Bedell & Burgess
ATTORNEYS

Jan. 25, 1966 L. J. WOLF 3,231,057
SHAFT COUPLING
Filed July 13, 1962 2 Sheets-Sheet 2
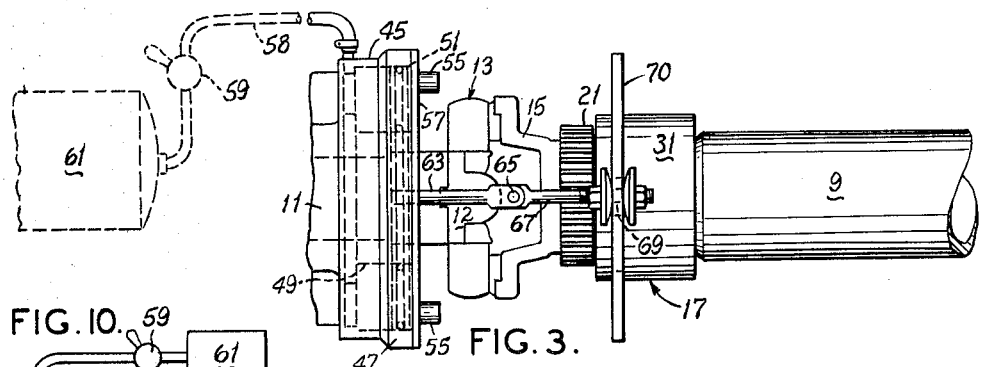
FIG. 10.
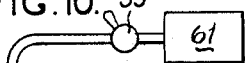
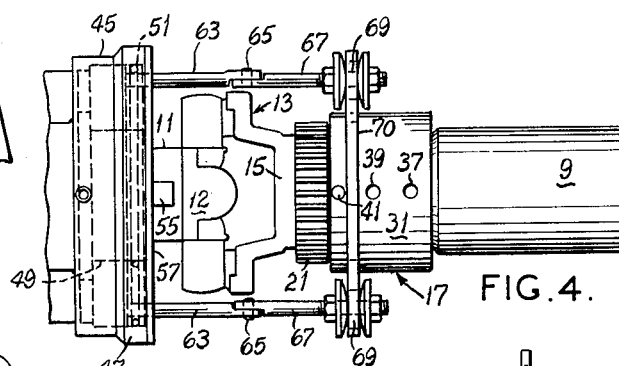
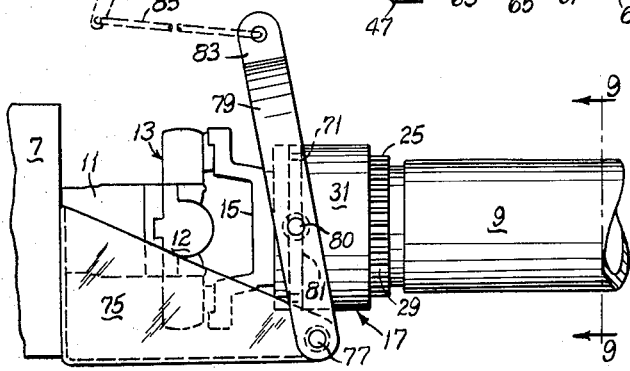
FIG. 8.
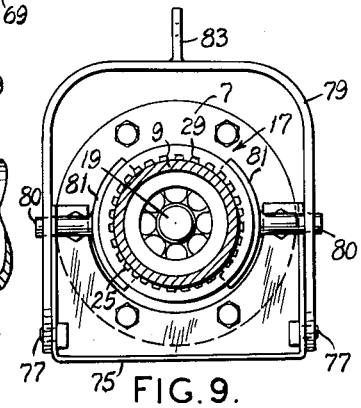
FIG. 9.
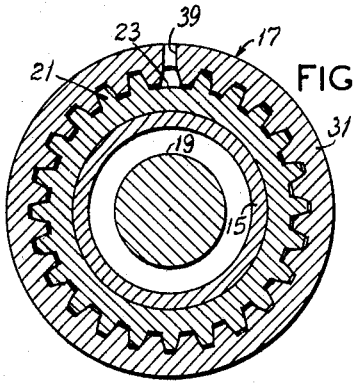
FIG. 6.
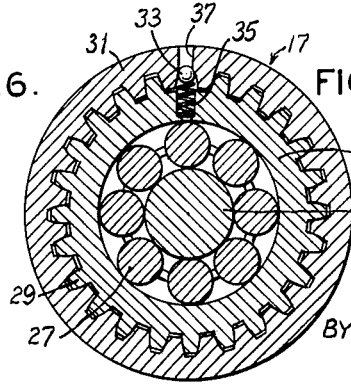
FIG. 7.
INVENTOR.
LLOYD J. WOLF.
BY Bedell & Burgess
ATTORNEYS.

United States Patent Office 3,231,057
Patented Jan. 25, 1966

3,231,057
SHAFT COUPLING
Lloyd J. Wolf, Dallas, Tex., assignor to General Steel Industries, Inc., Granite City, Ill., a corporation of Delaware
Filed July 13, 1962, Ser. No. 209,541
8 Claims. (Cl. 192—67)

The invention relates to shaft couplings and consists particularly in a quickly disconnectable coupling for the propeller shaft of a motor vehicle.

When it becomes necessary to tow a motor vehicle, and particularly one equipped with an automatic transmission, unless the differential and driving axle are disconnected from the transmission, the transmission may be seriously damaged. Furthermore the differential and the transmission if disconnected must be reconnected in the same relative rotational positions.

It accordingly is a main object of the invention to provide means for quickly disconnecting the differential from the transmission of a motor vehicle.

It is a further object to provide means for quickly and easily disconnecting the differential of a motor vehicle from the transmission and means for reconnecting these parts in the same relative rotational positions. It is a further object to provide remote control means whereby the transmission and differential can be quickly disconnected from the operator's station in the vehicle.

It is an additional object to provide mechanical linkage means for effecting the disconnection and reconnection of a vehicle transmission and the vehicle differential.

It is a still further object to provide fluid powered means for effecting disconnection and reconnection of a motor vehicle transmission and differential.

The foregoing and additional objects and advantages of the invention will be apparent from the following description and the accompanying drawings, in which:

FIG. 3 is a side view corresponding to FIG. 2, but with the coupling in the disconnect position.

FIG. 4 is a top view corresponding to FIG. 3.

FIG. 6 is a transverse vertical sectional view along line 6—6 of FIG. 2.

FIG. 7 is a transverse vertical sectional view along line 7—7 of FIG. 2.

FIG. 8 is a side view of another form of the coupling, showing schematically a manual control system therefor.

FIG. 9 is a transverse vertical sectional view along line 9—9 of the form illustrated in FIG. 8.

FIG. 10 is a schematic view of a modified pneumatic control for the coupling.

Figure 1:
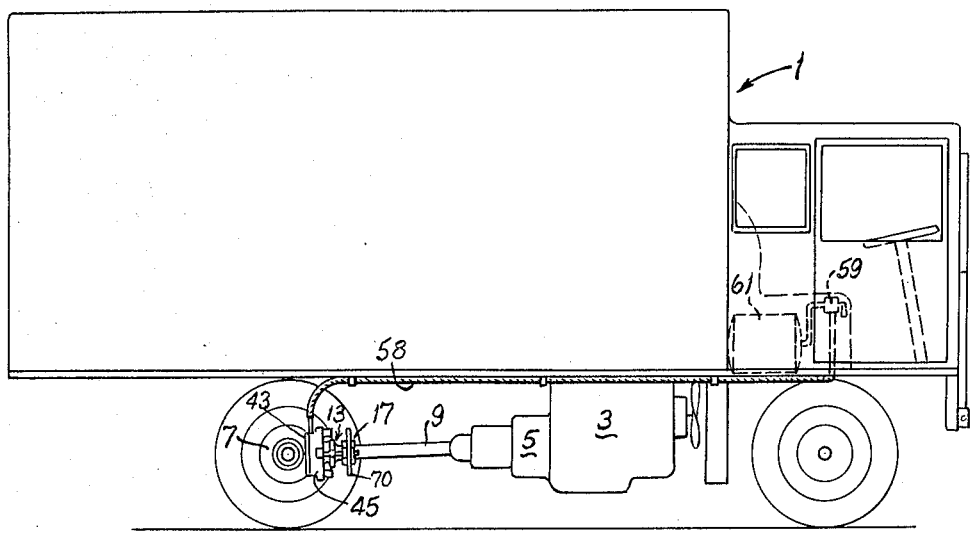
FIG. 1 is a side view of a motor vehicle embodying the invention and one form of control.

Referring now to the drawings, the numeral 1 generally indicates a motor vehicle, having the usual engine 3, automatic transmission 5, differential 7, and propeller shaft 9 by which power is transmitted from transmission 5 to differential 7. Differential 7 includes an input shaft 11, to the forward end of which is secured the driven member 12 of universal joint 13, the driving member 15 of which forms part of a coupling generally indicated at 17, which in turn is connected to the rear end of propeller shaft 9.

Figure 2:
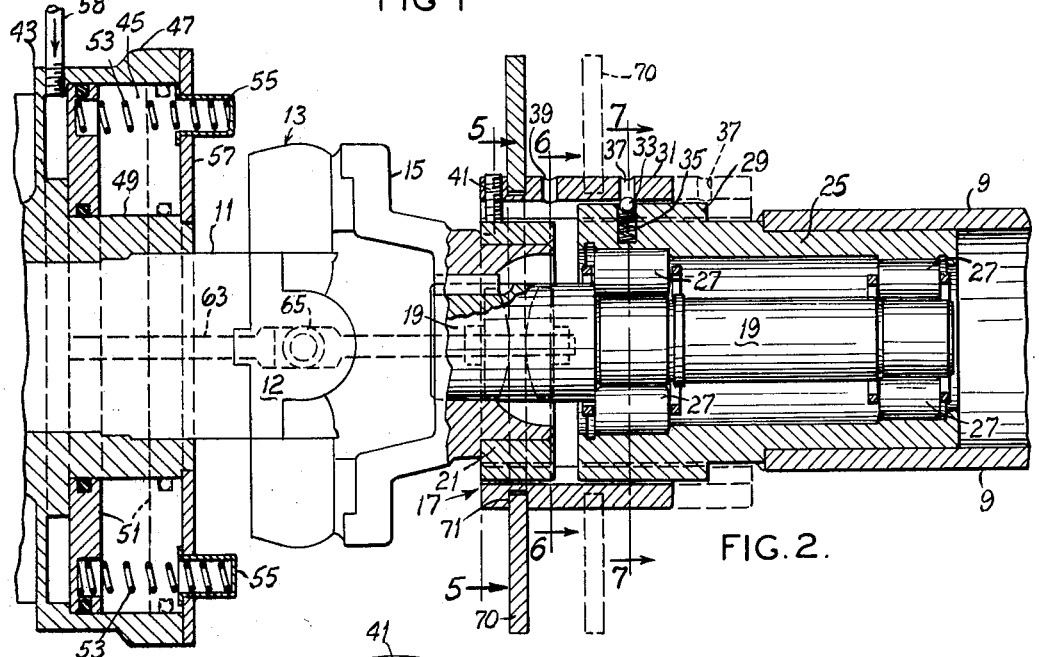
FIG. 2 is an enlarged longitudinal vertical sectional view of the coupling and control therefor illustrated in FIG. 1.
Figure 5:
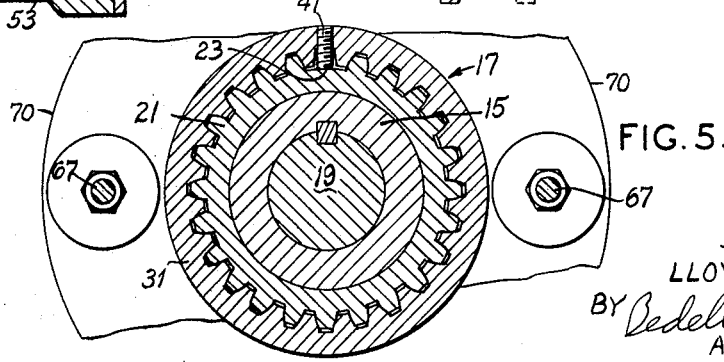
FIG. 5 is a vertical sectional view along line 5—5 of FIG. 2.

Universal joint driving member 15 rigidly mounts a forwardly extending spindle 19 and is surrounded by and also rigidly mounts a toothed annulus 21, one tooth of which is eliminated as at 23. A sleeve 25 which extends into and is rigidly secured to propeller shaft 9 is rotatably mounted on spindle 19 by suitable bearings 27 and is formed, at its rear end with teeth 29 identical to those on annulus 21 except that none of teeth 29 is eliminated. A collar 31, formed with inwardly directed teeth adapted for mating engagement with the teeth on annulus 21 and on sleeve 25, is slidably mounted on the toothed portion of sleeve 25 and is normally in registry with the teeth on annulus 21, being held in the position shown in FIG. 2 by means of ball detent 33 which is mounted in a radial hole in sleeve 25 and is biased radially outwardly therein by means of a coil spring 35. Collar 31 is radially apertured at 37 so that aperture 37 is in registry with ball detent 33 when collar 31 is in the coupled, or connected, position shown in the drawings, i.e., with its rear end in registry with the teeth of annulus 21. The coupling is disconnected by sliding collar 31 forwardly until its rear end is forward of the forward end of annulus 21, at which time a second radial aperture 39 comes into registry with ball detent 33, thereby to retain collar 31 in the retracted or uncoupled position when desired.

To insure that the propeller shaft 9 and differential input shaft 11 will be in the same relative rotatable positions when they are connected by coupling 17, collar 31 is provided with a screw 41 extending radially inwardly into the space between a pair of its teeth so that collar 31 can only be slid into registry with annulus 21 when screw 41 is aligned with the blind tooth portion 23 of annulus 21.

It will be evident from the foregoing, that when collar 31 is in the position shown, rotational movements of propeller shaft 9 will be transmitted to the input shaft 11 of the differential, and that when collar 31 is moved forwardly until ball detent 33 registers with radial aperture 39 in collar 31, the rear end of propeller shaft 9 and sleeve 25 will freely rotate about universal joint input spindle 19 without any of its rotational movement being transmitted to the differential, and consequently, if the vehicle is being towed while the parts are in this disconnected position, no rotational movement of the differential input shaft 11, universal joints 13, 15, and associated spindle 19, will be transmitted to the propeller and thence to the transmission, which might otherwise damage the transmission.

For operating the coupling, i.e., moving collar 31 between its rear connecting and its forward disconnected positions, cap 43 of differential 7 embodies an annular cylinder 45 having an outer peripheral wall 47 and an inner wall 49, the latter of which surrounds differential input shaft 11, and an annular piston 51 is slidably mounted in annular cylinder 45, being biased rearwardly therein by a plurality of springs 53 seated in suitable pockets 55 in annular plate 57 which forms the forward wall of annular cylinder 45. Rearwardly of the normal seated position of piston 51, cylinder 45 is connected by a suitable conduit 58 to a valve 59 adjacent the operator's station in the vehicle and through valve 59 to a source 61 of compressed air so that with valve 59 in one position, air will be admitted from source 61 through conduit 58 to cylinder 45 rearwardly of piston 51 thus urging piston 51 forwardly. At each side of cylinder 45, piston 51 mounts a forwardly extending rod 63 which is pivotally connected at its forward end at 65 to a similar rod 67 which in turn is connected as at 69 to an annular plate 70, the inner edge of which is rotatably received within an annular groove 71 in collar 31 so that forward movement of piston 51 will cause a corresponding forward movement of collar 31 and disengagement of the latter from toothed annulus 21 thereby disconnecting the coupling. Valve 59 is of the usual air valve type, with a vent position, so that by manually rotating it to the vent position, air will be permitted to escape from cylinder 45, permitting springs 53 to move the piston rearwardly to its seated position and, with it move collar 31 rearwardly to its normal position, with its teeth engaging the teeth of annulus 21 and thus providing a rotation transmitting connection between propeller shaft 9 and differential input shaft 11.

Operation of this form of the invention is as follows: Under normal operating conditions valve 59 would be maintained in its vent position, piston 51 would accordingly be biased to the position shown in the drawings, i.e., seated in its rearmost position, and collar 31 would be maintained in the connecting position shown by the engagement of ball detent 33 and aperture 37, so that rotational movements would be transmitted from propeller shaft 9, through sleeve 25 and collar 31, to annulus 21 and thence through universal joint 13, 15 to differential input shaft 11. In the event that the vehicle is disabled and must be towed, valve 59 can be rotated to provide communication between compressed air source 61 and cylinder 45 rearwardly of piston 51 whereby piston 51 will be urged forwardly and by means of connected rods 63 and 67, and annular plate 70, collar 31 will be moved forwardly until it is clear of the forward end of toothed annulus 21 and ball detent 33 engages aperture 39. If the vehicle is then towed, no damage will be caused by undesired transmission of rotational movement from the wheels and through the differential and propeller shaft to the automatic transmission.

The embodiment of the invention illustrated in FIGS. 8 and 9 includes the same coupling 17 as does the first embodiment, but a different control therefor comprising a forwardly extending bracket 75 of generally channel cross section attached at its rear end to the forward end of differential 7 and terminating forwardly thereof immediately beneath collar 31 of coupling 17 and there providing a transverse pivot 77 for the ends of lever 79 of inverted U-shape, which extends from the pivot point upwardly and around collar 31. In alignment with a transverse diameter of collar 31, the upstanding legs of lever 79 each pivotally mounts, at 80, ring segment 81, segment 81 being received in groove 71 in collar 31 so that forward and rearward movements of lever 79 will cause corresponding forward and rearward movements of collar 31 and corresponding disengagement and engagement of the collar with toothed annulus 21. The upper end of lever 79 is provided with an upstanding tongue 83, which is connected by linkage 85 (shown schematically) to an operating handle 87 adjacent the operator's station in the vehicle whereby engagement and disengagement of coupling 17 can be remotely effected. Alternatively, as shown in FIG. 10, tongue 83 may be connected by linkage 89 to an air cylinder 91, which in turn may be controlled in the manner described in connection with air cylinder 45 in the first-described embodiment of the invention.

The details of the structures disclosed may be varied substantially without departing from the spirit of the invention and the exclusive use of those modifications as come within the scope of the appended claims is contemplated.

What is claimed is:

1. Apparatus comprising fixed structure, a first shaft rotatable therein, an element rotatable with said first shaft and having a portion provided with teeth on its circumference, a second shaft aligned with a portion of said element and mounting at its one end a member having similar teeth on its circumference, a collar having teeth on its internal circumference adapted for sliding engagement with said teeth on said element and said member, said collar being shiftable axially of said element and said member for selective engagement with and disengagement from one of said toothed circumferences, said fixed structure mounting an annular cylinder surrounding said first shaft, there being an annular piston received within said cylinder and movable axially thereof, means for selectively introducing fluid under pressure into said cylinder at one side of said piston, yieldable means biasing said piston against movement by said fluid means, and linkage means connecting said piston and said collar whereby to move said collar between retracted and extended positions responsive to the introduction of fluid under pressure to said cylinder and the removal of pressure therefrom, said rotatable element comprising a pair of universally-joined members, one of said universally-joined members being secured to said first shaft, said first-named teeth being mounted on the circumference of said other universally-joined member.

2. Apparatus according to claim 1, in which said linkage means is pivotally jointed intermediate its ends to accommodate relative universal movement of said universally-joined members, the connection of said linkage means to said collar comprising an annular member surrounding said collar and engageable with opposing transverse surfaces thereof for accommodating rotational movements of said coupling and said collar and transmitting axial movements of said piston to said collar.

3. Apparatus comprising fixed structure, a first shaft rotatable therein, an element rotatable with said first shaft and having a portion provided with teeth on its circumference, a second shaft aligned with a portion of said element and mounting at its one end a member having similar teeth on its circumference, a collar having teeth on its internal circumference adapted for sliding engagement with said teeth on said element and said member, said collar being shiftable axially of said element and said member for selective engagement with and disengagement from one of said toothed circumferences, said fixed structure mounting an annular cylinder surrounding said first shaft, there being an annular piston received within said cylinder and movable axially thereof, means for selectively introducing fluid under pressure into said cylinder at one side of said piston, yieldable means biasing said piston against movement by said fluid means, and linkage means connecting said piston and said collar whereby to move said collar between retracted and extended positions responsive to the introduction of fluid under pressure to said cylinder and the removal of pressure therefrom, one of said toothed circumferences having a blind tooth and said collar including an obstruction between two of its adjacent teeth whereby said collar member and said one toothed circumferences can mesh with each other only when said obstruction is aligned with said blind tooth.

4. Apparatus comprising fixed structure, a first shaft rotatable therein, an element rotatable with said first shaft and having a portion provided with teeth on its circumference, a second shaft aligned with a portion of said element and mounting at its one end a member having similar teeth on its circumference, a collar having teeth on its internal circumference adapted for sliding engagement with said teeth on said element and said member, said collar being shiftable axially of said element and said member for selective engagement with and disengagement from one of said toothed circumferences, said fixed structure mounting an annular cylinder surrounding said first shaft, there being an annular piston received within said cylinder and movable axially thereof, means for selectively introducing fluid under pressure into said cylinder at one side of said piston, yieldable means biasing said piston against movement by said fluid means, and linkage means connecting said piston and said collar whereby to move said collar between retracted and extended positions responsive to the introduction of fluid under pressure to said cylinder and the removal of pressure therefrom, said linkage means including an annular member surrounding said collar and engageable with opposing transverse surfaces thereof for accommodating relative rotational movements of said fixed structure and said collar and transmitting axial movements of said piston to said collar.

5. Apparatus according to claim 4, in which said tooth mounting portions of said element and said member are in relatively rotatable interfitting male and female relation whereby to maintain said toothed circumferences constantly in axial alignment.

6. Apparatus comprising fixed structure, a first shaft rotatable therein, an element rotatable with said first shaft and having a portion provided with teeth on its circumference, a second shaft aligned with a portion of said element and mounting at its one end a member having similar teeth on its circumference, a collar having teeth on its internal circumference adapted for sliding engagement with said teeth on said element and said member, said collar being shiftable axially of said element and said member for selective engagement with and disengagement from one of said toothed circumferences, a bracket extending from said fixed structure and having an end portion underlying said collar, there being a lever pivotally connected to said end portion and connected thereabove to said collar whereby to move said collar axially with respect to said rotatable element and said second shaft when said lever is pivoted about its pivot connection to said bracket, said lever comprising a pair of spaced upright members on opposite sides of said collar, there being means connecting said upright members to the adjacent sides of said collar, said bracket comprising a channel-shaped member surrounding the lower part of said first shaft, said lever being of inverted U-shape and upwardly surrounding said collar, there being means on the upper portions of said lever for positioning said lever between forward and rearward positions whereby to similarly position said collar.

7. Apparatus comprising fixed structure, a first shaft rotatable therein, an element rotatable with said first shaft and having a portion provided with teeth on its circumference, a second shaft aligned with a portion of said element and mounting at its one end a member having similar teeth on its circumference, a collar having teeth on its internal circumference adapted for sliding engagement with said teeth on said element and said member, said collar being shiftable axially of said element and said member for selective engagement with and disengagement from one of said toothed circumferences, a bracket extending from said fixed structure and having an end portion underlying said collar, there being a lever pivotally connected to said end portion and connected thereabove to said collar whereby to move said collar axially with respect to said rotatable element and said second shaft when said lever is pivoted about its pivot connection to said bracket, said lever comprising a pair of spaced upright members on opposite sides of said collar, there being means connecting said upright members to the adjacent sides of said collar, and inwardly directed ring segments pivotally connected to said upright members and engageable with opposing transverse surfaces of said collar whereby to accommodate rotation of said collar and transmit movements axially of said collar from said lever to said collar.

8. In a motor vehicle according to claim 7, said collar being provided with an annular groove and said ring segments being received in said groove and in slidable engagement with the inner circumferential and transverse surfaces thereof.

References Cited by the Examiner

UNITED STATES PATENTS

| | | | |
|---|---|---|---|
| 1,696,179 | 12/1928 | Ahlm | 192—67 X |
| 1,965,985 | 7/1934 | Morgan | 180—14 |
| 2,010,796 | 8/1935 | Bourque | 192—67 X |
| 2,101,897 | 12/1937 | Coultas | 192—67 X |
| 2,556,678 | 6/1951 | Crafts | 192—114 |
| 2,583,556 | 1/1952 | Fleischel. | |
| 2,839,902 | 6/1958 | Glover | 64—9 |
| 2,906,383 | 9/1959 | Gabriel. | |
| 2,948,557 | 8/1960 | Howe | 192—67 X |

FOREIGN PATENTS 452,941 11/1927 Germany.

DON A. WAITE, *Primary Examiner.*

ROBERT C. RIORDON, DAVID J. WILLIAMOWSKY,
*Examiners.*